Patented Mar. 19, 1940

2,194,082

UNITED STATES PATENT OFFICE 2,194,082

METHOD OF REACTING CARBON DIOXIDE AND AMMONIA

Robert B. Booth, Springdale, Conn., assignor to American Cyanamid Company, New York, N. Y., a corporation of Maine No Drawing. Application September 30, 1938, Serial No. 232,613

7 Claims. (Cl. 260—534)

The present invention relates to a simple method of producing ammonium carbamate.

It has heretofore been proposed to produce this material by gas phase reaction between carbon dioxide and ammonia. While this process is reasonably satisfactory from the standpoint of recovery of the desired product, yet certain difficulties accompany the procedure, notably that apparatus of large capacity is necessary to handle the gaseous reactants and, moreover, it is not always a simple matter to recover solids thus formed from such a large volume of gas.

The principal object of the present invention is to devise a simple method capable of being carried out in small, cheap apparatus but which will have a high degree of efficiency and, consequently, materially reduce the commercial cost of the entire equipment and operation.

I have found that this object may be readily accomplished by contacting the two constituents in non-gaseous phase, that is, either solid or liquid. Inasmuch as both liquid ammonia and solid carbon dioxide are very cheap articles of commerce, readily available, the method may be advantageously carried out by either dropping carbon dioxide into a volume of liquid ammonia or conversely, dropping liquid ammonia onto a mass, preferably porous, of carbon dioxide. Under these circumstances, reaction to ammonium carbamate proceeds smoothly and without difficulty.

While the efficiency of the reaction is materially increased where the operations are conducted within a closed reaction chamber so as to permit of recovery of vaporized reactant and/or reaction product, yet the reaction has been successfully carried out by simply dropping lumps of carbon dioxide into an open vessel containing liquid ammonia at the boiling point of the latter, using the ammonia in excess and permitting it to take up the heat of reaction through evaporation. Under these circumstances and with no attempt to recover excess ammonia, 25 pounds of ammonium carbamate was produced using only 14 pounds of liquid ammonia.

One efficient method of practicing the present reaction is to provide a closed vessel to receive the reactants and equipped with a recovery system. Under these circumstances, a volume of liquid ammonia is placed in the reaction vessel and small quantities of solid carbon dioxide introduced thereinto. Due to the greater specific gravity of the $CO_2$, the solid particles eventually sink below the surface of the ammonia, thus being completely immersed therein which causes almost complete reversion to ammonium carbamate without material loss of the $CO_2$. The exothermic heat of reaction is taken up by evaporation of the excess ammonia which passes to the recovery system, where liquefaction and recycling is a simple matter. Where substantial quantities of the carbamate pass out of the reaction vessel, a dust collector in the form of filters or cottrells may be provided to recover the same.

Another manner of advantageously carrying out the reaction is to provide a brick or mass of solid $CO_2$ in a closed reaction chamber equipped with a recovery system and to direct against the solid $CO_2$ a stream of ammonia gas. Under these circumstances, it will be found that a solid gas phase reaction takes place on or beneath the surface of the solid $CO_2$ with the formation of a shell of ammonium carbamate therearound. Due to the internal pressure of the carbon dioxide block or to the force of the injected ammonia or both, this thus formed ammonium carbamate separates itself from the unused carbon dioxide, falls to the bottom of the chamber, thus exposing fresh quantities of the carbon dioxide block to reaction. The dislodgement of the carbamate as formed may be facilitated by mechanical means such as vibration, scraping or the like. Any carbamate escaping from the reaction vessel may be recovered in any suitable manner, preferably as above described.

It will be obvious, of course, that the reactants should be in the substantially anhydrous state as otherwise the presence of water would lead to the formation of ammonium carbonate.

In the event that either or both of the reactants are not completely anhydrous or in such cases where the moisture may not be advantageously completely excluded, leading to the formation of both carbamate and carbonate, this does not create any extreme difficulties inasmuch as ammonium carbamate is soluble in liquid ammonia, while ammonium carbonate is not. Consequently, the two substances may be readily separated by using a sufficiently large excess of ammonia and filtering the contents of the reaction vessel. The ammonium carbonate will appear in the filter cake while the ammonium carbamate may be recovered by evaporation of the excess ammonia from the filter.

If desired, the ammonium carbonate from the filter cake may be worked up again into $CO_2$ and ammonia and recycled.

In the claims, where the word "non-gaseous"

is used, it is intended to indicate either a solid or a liquid state.

While the invention has been shown and described with particular reference to specific embodiments, it is to be understood that the invention is not to be limited thereto but is to be construed broadly and restricted only by the scope of the claims.

I claim:

1. The process of producing ammonium carbamate which comprises contacting non-gaseous $CO_2$ with liquid ammonia under substantially anhydrous conditions.

2. The process of claim 1 in which the $CO_2$ is solid.

3. The process of claim 1 in which the $CO_2$ is liquid.

4. The process of producing ammonium carbamate which comprises contacting no-gaseous $CO_2$ with liquid ammonia under substantially anhydrous conditions in the presence of an excess of one of the reactants and absorbing the heat of reaction by evaporation of such excess.

5. A process of producing ammonium carbamate which comprises adding solid carbon dioxide to an excess quantity of liquid ammonia under substantially anhydrous conditions and recovering the gaseous ammonia evaporated by reason of the exothermic heat of reaction.

6. A process of producing ammonium carbamate which comprises adding solid carbon dioxide to an excess quantity of liquid ammonia under substantially anhydrous conditions, filtering the contents of the reaction vessel to remove any solid ammonium carbonate and recovering ammonium carbamate from the filtrate.

7. The process of producing ammonium carbamate which comprises contacting non-gaseous $CO_2$ with ammonia under substantially anhydrous conditions by directing a stream of $NH_3$ against a mass of solid $CO_2$, separating the shell of ammonium carbamate formed from the mass of $CO_2$ and continuing the process until the $CO_2$ has been consumed.

ROBERT B. BOOTH.